United States Patent Office 2,975,210
Patented Mar. 14, 1961

2,975,210

ESTERIFICATION PROCESS COMPRISING REACTING A MONO-OLEFIN WITH AN ACID ESTER

Louis O. Raether, Webster Groves, and Harry R. Gamrath, St. Louis, Mo., assignors to Monsanto Chemical Company, St. Louis, Mo., a corporation of Delaware No Drawing. Filed Mar. 14, 1958, Ser. No. 721,354

20 Claims. (Cl. 260—475)

This invention relates to a novel process for the further esterification of acid esters of organic polycarboxylic acids by the reaction of such acid esters with olefins containing five or more carbon atoms.

It is known that acid and neutral esters of organic polycarboxylic acids can be prepared by the reaction of organic polycarboxylic acids with the lower olefins, such as ethylene, propylenes and butylenes. While there is a suggestion in the prior literature that higher olefins containing five or more carbon atoms can also be reacted with organic polycarboxylic acids to produce either acid or neutral esters, to the contrary, we have found that in general organic polycarboxylic acids do not react with such higher olefins to produce, to any practical extent, a neutral ester of the organic polycarboxylic acid or even an acid ester of the polycarboxylic acid. Furthermore, we have also found that olefins containing five or more carbon atoms will not react to any practical extent with acid esters of organic polycarboxylic acids containing secondary ester groups having four or more carbon atoms, i.e., ester groups of the type which would be derived from the esterification of a carboxylic acid group with a secondary alcohol having four or more carbon atoms. This is particularly signficant in view of the fact that the reaction between an olefin and a carboxylic acid group, in those cases where there is reaction to form an ester, results in a secondary ester group, and never a primary ester group.

It is an object of this invention to provide a method whereby an olefin containing five or more carbon atoms can be reacted with acid esters of organic polycarboxylic acids. It is a further object of this invention to provide a method whereby esters of organic polycarboxylic acids containing ester groups of five or more carbon atoms can be produced by reaction of an olefin and acid esters of said organic polycarboxylic acids.

We have discovered that acid esters of polycarboxylic acids having at least one primary ester group containing four or more carbon atoms can be further esterified with olefins containing five or more carbon atoms, and that the presence of at least one such primary ester group is necessary in order to esterify the remaining carboxylic acid groups with olefins containing five or more carbon atoms. Thus, for example, while an octene and phthalic acid or phthalic anhydride cannot be reacted together directly to produce dioctyl phthalate or an octyl acid phthalate, a dioctyl phthalate can now be prepared by the reaction of phthalic acid or phthalic anhydride and a primary octyl alcohol to produce a primary octyl acid phthalate, and thereafter said octyl acid phthalate can be reacted with an octene in accordance with this invention; thus, it is not possible by our invention to substitute relatively-inexpensive olefin for one-half of the octyl alcohol normally used in processes for the production of dioctyl phthalate. In broad terms, by our invention relatively-inexpensive olefin can be substituted for the alcohols normally used in esterification processes for the further esterification of acid esters of polycarboxylic acids.

In accordance with this invention, compounds of the formula

wherein $m$ is one or a whole number greater than one, $n$ is one or a whole number greater than one, R is an organic radical, R' is an aliphatic radical containing at least three carbon atoms, and R'' is an aliphatic group containing at least five carbon atoms as derivable from a secondary alcohol containing five or more carbon atoms, are prepared by reacting (1) an acid ester of an organic polycarboxylic acid having the formula

wherein $m$ is one or a whole number greater than one, R is an organic radical and preferably a hydrocarbon radical free of olefinic or acetylinic unsaturation containing from two to fourteen carbon atoms, such as ethylene, butylene, hexylene, phenylene, tolylene, naphthylene, etc., and R' is an aliphatic radical containing at least three carbon atoms and preferably an aliphatic hydrocarbon radical containing at least three but not more than twenty carbon atoms, with (2) mono-ethylenically unsaturated olefins containing at least five carbon atoms and having the formula,

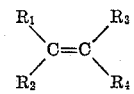

wherein $R_1$, $R_2$, $R_3$ and $R_4$ are selected from hydrogen and aliphatic radicals, at least one of $R_1$, $R_2$, $R_3$ and $R_4$ is hydrogen, and the total of the carbon atoms of $R_1$, $R_2$, $R_3$ and $R_4$ is at least three; preferably, the olefins are those containing five to twenty carbon atoms having the structure, $$R_a-CH=CH-(CH_2)_xH$$

wherein $x$ is an integer from 0 to 9 and wherein $R_a$ is an aliphatic hydrocarbon radical containing from three to eighteen carbon atoms.

As illustrative of operable olefins are pentene-1, pentene-2, 3-methyl-butene-1, 3-methyl-butene-2, hexene-1, hexene-2, hexene-3, 4-methyl-pentene-1, 4-methyl-pentene-2, 4,4-dimethyl-butene-1, heptene-1, heptene-2, 3-ethyl-pentene-1, octene-1, octene-2, octene-3, 4,6-dimethyl-hexene-1, nonene-1, nonene-2, nonene-3, 2,6-dimethyl-heptene-3, 4,6-dimethylheptene-1 decene-1, decene-2, decene-4, undecene-1, undecene-2, dodecene-1, dodecene-2, 4,6,8 - trimethyl - nonene - 1, 4,6,8-trimethyl-nonene-2, tetradecene-1, tetradecene-2, octadecene-1, octadecene-9, and the like, as well as the mono-ethylenically unsaturated olefin polymers, such as propylene trimers (9-carbon olefins), propylene tetramers (12-carbon olefins), propylene pentamers (15-carbon olefins), and the like. While the olefin reactant of this invention can be employed in substantially $m$ mols per molecular proportion of the partial ester of the polycarboxylic acid of this invention, wherein $m$ is the number of free carboxyl groups in said partial ester, optimum results are obtained employing 10% to 100% molar excess thereof. The olefin which is used can be in admixture with a saturated alkane or other hydrocarbons such as benzene, toluene, xylene and the like, which, for example, would be the type of hydrocarbon mixture obtained from a gas stream entering a cracking unit in a gasoline plant. Also, inert solvents such as benzene, toluene, xylene and other hydrocarbons can be used as the reaction medium.

Non-limiting examples of acid esters suitable for use in the method of this invention are n-butyl acid succinate, isobutyl acid succinate, n-amyl acid succinate, isooctyl acid succinate, lauryl acid succinate, isoamyl acid dimethylsuccinate, n-hexyl acid diethylsuccinate, n-octadecyl acid succinate, 2-ethylhexyl acid glutarate, n-decyl acid glutarate, n-amyl acid adipate, n-undecyl acid adipate, n-nonyl acid adipate, n-butyl acid pimelate, isooctyl acid pimelate, n-octyl acid suberate, isobutyl acid sebacate, 4-methyl-n-pentyl acid sebacate, mono-n-butyl ester of cyclohexane-1,4-dicarboxylic acid, di-n-butyl esters of citric acid, n-octyl 2-octyl esters of citric acid, n-butyl acid phthalate, n-hexyl acid phthalate, n-octyl acid phthalate, 2-ethylhexyl acid phthalate, isooctyl acid phthalate, isononyl acid phthalate, isodecyl acid phthalate, isododecyl acid phthalate, tridecyl acid phthalate, lauryl acid phthalate, n-octadecyl acid phthalate, n-nonyl acid phthalate, isoamyl acid terephthalate, n-dodecyl acid terephthalate, n-octyl acid isophthalate, lauryl acid isophthalate, n-hexyl acid dihydroterephthalate, n-octyl acid tetrahydroisophthalate, n-butyl acid dichlorophthalate, 2-ethylhexyl acid tetrachlorophthalate, n-butyl acid esters of naphthalene polycarboxylic acids, mono- and di-n-butyl esters of trimesic acid, n-butyl 2-octyl esters of trimesic acid, di-n-hexyl ester of mallophanic acid, di(n-octyl) acid ester of trimellitic acid, tetra- and penta-n-butyl esters of mellitic acid, n-octyl half ester of anthracane dicarboxylic acid, and the like.

It is generally necessary to employ a catalyst in the method of our invention and Lewis acid compounds are, in general, suitable catalysts. Non-limiting examples of such Lewis acid compounds are $BF_3$, $HClO_4$, $ZnCl_2$-(anhydrous), sulfuric acid (100%), HCl, $TiCl_4$, $SnCl_4$, $H_3PO_4$, $H_3PO_4 \cdot BF_3$, $BCl_3$, HI, $I_2$, $H_3PO_4 \cdot P_2O_5$, HF, p-toluene sulfonic acid, $FSO_3H$, $H_2SiF_6$, $HBF_3OR$ (where R is an alkyl group), $HBF_2(OH)_2$, etc.; $AlCl_3$ is an example of those Lewis acid compounds which would themselves react with a carboxyl group and therefore are not suitable for use as a catalyst for this type of reaction. Of the above catalysts, $HClO_4$ is particularly outstanding because of the very small quantity required to promote high yields with the process of this invention.

According to one embodiment of this invention, when $BF_3$ is employed as the catalyst, any catalytic amount of boron trifluoride can be used; however, it is preferred that about 10 to about 25 grams of $BF_3$ be employed per gram molecular proportion of the partial ester reactant of this invention. Boron trifluoride can be added to the reaction system in a variety of ways, for example, as a gas, as an addition compound with the partial ester reactant of this invention or other carboxylic acid, as an addition compound with a low molecular weight ether, as an addition compound with an ether such as dimethyl ether, diethyl ether, dipropyl ether, ethylpropyl ether, ethylbutyl ether, dibutyl ether, all of which addition compounds are well known in the art. The addition compounds of $BF_3$ and a dialkyl ether, wherein the alkyl groups are like or unlike, provide optimum results.

In general, the process of this invention can be carried out at any temperature above the freezing point of the reaction up to about 145° C. However, it is preferred that temperatures in the range of about 70° C. to about 90° C. be employed.

The following examples are illustrative of the process of this invention. In each example, unless otherwise indicated, all parts are by weight and the reaction vessel was equipped with a thermometer, agitator, reflux condenser and means for the introduction of the reactants.

*Example 1* n-Butyl acid succinate was first prepared by heating and reacting for about three hours at about 106° C. approximately 50 parts of succinic anhydride and approximately 37 parts of n-butyl alcohol. Approximately 85 parts by weight of octene-1 are then added and the entire mass heated at about 87° C. for about 25 minutes. The catalyst was then added as approximately 20 parts by weight of boron trifluoride-diethyl ether addition compound (which contains about 44% by weight of $BF_3$). Upon completing the catalyst addition, the mass was heated at about 77° C. for about 10 hours, and then cooled to about 0° C. and filtered. To the filtrate was then added approximately 100 parts of water and the mix agitated for about 5 minutes at 55–60° C. The organic layer was withdrawn from the aqueous layer and mixed with approximately 100 parts of water containing 6.8 parts by volume of 50% aqueous lye and agitated for about 10 minutes at 60–65° C. The organic liquid layer was then withdrawn and washed with two successive 100-part portions of water at 60–65° C. and the water washes discarded. The washed organic liquid was then subjected to vacuum distillation to remove the volatile components. The residue, approximately 104.6 parts, was 2-octyl n-butyl succinate, specific gravity at 25° C. of 0.929 and an $n_D^{25}$ of 1.4338. The yield of n-butyl 2-octyl succinate, based on n-butyl acid succinate used, was 89.8%.

*Example 2*

The reactor was charged with approximately 74 parts of phthalic anhydride and 37 parts of n-butyl alcohol which were heated to about 120° C. over a period of about 1½ hours to prepare n-butyl acid phthalate. While the butyl acid phthalate was held above its melting point, 70–75° C., gaseous boron trifluoride was added. The exothermic formation of the acid ester-boron trifluoride complex was controlled by cooling so that the temperature of the reaction mass did not exceed 75–80° C. The addition of boron trifluoride gas to the acid ester was continued until the evolution of heat was essentially ended. The total time elapsed for the formation of the complex was 15–20 minutes. To the acid ester-boron trifluoride complex there were added 85 parts of a mixture of 60% 1-octene and 40% 2-octene, the resulting mass was heated at about 75–80° C. for a period of about 10 hours, and thereafter the mass was cooled to about 0° C. and filtered. Approximately 7.6 parts of crystalline acid ester were recovered from this filtration, which can be used in subsequent batches. To the filtrate were added approximately 100 parts of water and the mix agitated for about 5 minutes at 55–60° C. The organic layer was withdrawn from the aqueous layer, mixed with approximately 100 parts of water containing approximately 7.2 parts by volume of 50% aqueous sodium hydroxide, and agitated for about 10 minutes at about 60–65° C. The organic layer was withdrawn and washed with two successive 100-part portions of water at 60–65° C. and the water washes discarded. The washed organic liquid was then subjected to vacuum distillation to remove the volatile components. The organic residue, approximately 127.7 parts, was a mixture of butyl sec.-octyl phthalates, specific gravity at 25° C. of 0.999 and $n_D^{25}$ of 1.4460. The yield of n-butyl sec.-octyl phthalates, based on n-butyl acid phthalate used, was 89.8%.

*Example 3*

The reactor was charged with approximately 74 parts of phthalic anhydride and approximately 37 parts of n-butyl alcohol which were heated to about 120° C. over a period of about 1½ hours to prepare n-butyl acid phthalate, to which was added approximately 105 parts of decene-1. The esterification mixture was heated to 75–85° C. after approximately 5 parts of boron trifluoride-diethyl ether addition compound had been added. Upon completing the catalyst addition, the mass was heated at about 75–85° C. for about 10 hours and then cooled to about 0° C. and filtered to recover any unreacted starting materials. To the filtrate were added approximately 100 parts of water, and the mix agitated for about 5 minutes at 55–60° C. The organic layer was withdrawn from the aqueous layer, mixed with approximately 100 parts of water containing 7.2 parts by volume of 50% aqueous lye, and agitated for about 10 minutes at 60–65° C. The organic liquid layer was withdrawn and washed with two successive 100-part portions of water at 70–75°

C. and the water washes discarded. The washed organic liquid was then subjected to vacuum distillation to remove the volatile components. The organic residue, representing a substantial yield of n-butyl 2-decyl phthalate, had a specific gravity at 25° C. of 0.989 and an $n_D^{25}$ of 1.4378.

*Example 4*

To a quantity of n-butyl acid phthalate prepared as in Example 3 were added approximately 105 parts of decene-1, and the mass heated at about 70–75° C. for about 25 minutes, at which time approximately 5 parts of 100% sulfuric acid were added. Upon completing the catalyst addition, the mass was heated at about 75–85° C. for about 10 hours, then cooled to about 0° C. and filtered to separate any unreacted starting materials. To the filtrate were then added approximately 100 parts of water and the mix agitated for about 5 minutes at 65–70° C. The organic layer was withdrawn from the aqueous layer and mixed with approximately 100 parts of water containing 7.5 parts by volume of 50% aqueous sodium hydroxide, and agitated for about 10 minutes at 65–70° C. The organic liquid layer was withdrawn and washed with two successive 100-part portions of water at 70–75° C. and the water washes discarded. The washed organic liquid was then subjected to vacuum distillation to remove the volatile components. The residue, representing a substantial yield of n-butyl 2-decyl phthalate, had a specific gravity at 25° C. of 0.989 and an $n_D^{25}$ of 1.4380.

*Example 5*

The reaction vessel was charged with approximately 74 parts of phthalic anhydride and approximately 65 parts of 2-ethylhexyl alcohol which were heated to about 125° C. over a period of about 2 hours, to which were then added approximately 105 parts of decene-1. The mixture of acid ester and olefin was heated to approximately 70–75° C., and then approximately 5 parts of 72% perchloric acid were added as a catalyst. Upon completing the catalyst addition, the mass was heated at about 75–80° C. for about 12 hours, then cooled to about 0° C. and filtered to separate any unreacted starting materials. To the filtrate were then added approximately 120 parts of water and the mix agitated for about 5 minutes at 65–75° C. The organic layer was withdrawn from the aqueous layer, mixed with approximately 100 parts of water containing 7.7 parts by volume of 50% aqueous lye, and agitated for about 10 minutes at 70–75° C. The organic liquid layer was withdrawn and washed with two successive 100-part portions of water at 65–75° C. and the water washes discarded. The washed organic liquid was then subjected to vacuum distillation to remove the volatile components. The organic residue, approximately 138.1 parts by weight, was 2-decyl-2-ethylhexyl phthalate, having a specific gravity at 25° C. of 0.978 and an $n_D^{25}$ of 1.434. The yield of 2-decyl 2-ethylhexyl phthalate, based on 2-ethylhexyl acid phthalate, was 90.8%.

*Example 6*

To a quantity of n-butyl acid phthalate prepared as in Example 3 were added approximately 126 parts of dodecene-1, and the mass warmed to approximately 80° C. for about 5–10 minutes, at which time there were added, as the catalyst, approximately 10 parts of boron trifluoride-diethyl ether addition compound (which contains about 44% by weight of $BF_3$). Upon completing the catalyst addition, the mass was heated at about 80–85° C. for about 10 hours, then cooled to about 0° C. and filtered to recover any unreacted starting materials. To the filtrate were then added approximately 100 parts of water and the mix agitated for about 5 minutes at 65–75° C. The organic layer was withdrawn from the aqueous layer, mixed with approximately 100 parts of water containing 7.7 parts by volume of 50% aqueous lye, and agitated for about 10 minutes at 60–65° C. The organic liquid layer was withdrawn and washed with two successive 100-part portions of water at 70–75° C. and the water washes discarded. The washed organic liquid was then subjected to vacuum distillation to remove the volatile components. The organic residue, approximately 137.9 parts by weight, was n-butyl 2-dodecyl phthalate, having a specific gravity at 25° C. of 0.980 and an $n_D^{25}$ of 1.4429. The yield of n-butyl 2-dodecyl phthalate (a new compound which has not been prepared heretofore), based on n-butyl acid phthalate used, was 92.3%.

*Example 7*

The reaction vessel was charged with approximately 74 parts of phthalic anhydride and approximately 79 parts of isodecyl (oxo) alcohol which were heated to about 130° C. over a period of about 2 hours. To the prepared isodecyl acid phthalate, there were added approximately 105 parts of decene-1. With this reaction mass at 75–80° C., there were added approximately 70 parts of boron trifluoride-diethyl ether addition compound. Upon completing the catalyst addition, the mass was heated at about 85–88° C. for about 10 hours, cooled to about 0° C. and filtered to remove any unreacted starting materials. To the filtrate were added approximately 100 parts of water and the mix agitated for about 10 minutes at 60–70° C. The organic layer was withdrawn from the aqueous layer, mixed with approximately 100 parts of water containing 7.7 parts by volume of 50% aqueous lye, and agitated for about 10 minutes at 65–75° C. The organic liquid layer was withdrawn and washed with two successive 100-part portions of water at 65–75° C. and the water washes discarded. The washed organic liquid was then subjected to vacuum distillation to remove the volatile component. The residue, representing an excellent yield of isodecyl 2-decyl phthalate, a new compound, had a specific gravity of 0.9672 at 25° C. and a refractive index at 25° C. of 1.480.

*Example 8*

A reaction vessel was charged with approximately 74 parts of phthalic anhydride and approximately 37 parts of n-butyl alcohol which were heated to 120° C. for a period of about 1½ hours to prepare n-butyl acid phthalate, to which was added approximately 126 parts of 1-dodecene and the mass heated at about 70–75° C. for about 10 minutes. A catalyst was then added as approximately 10 parts by weight of boron trifluoride-diethyl ether complex (which contains about 44% by weight of $BF_3$) and 7 grams of trichloroacetic acid. Upon completing the catalyst addition, the mass was heated at about 80–85° C. for about 10 hours, then cooled to about 0° C. and filtered to recover any unreacted starting materials. To the filtrate were added about 100 parts of water and the mix agitated for about 5 minutes. The organic layer was withdrawn from the aqueous layer, mixed with approximately 100 parts of water containing 7.7 parts by volume of 50% aqueous lye, and agitated for about 10 minutes at 65–70° C. The organic liquid layer was withdrawn and washed with successive 100-part portions of water at 60–65° C. The washed organic liquid was then subjected to vacuum distillation to remove the volatile components. The residue, approximately 139.6 parts by weight, was butyl 2-dodecyl phthalate, specific gravity at 25° C. 0.987 and an $n_D^{25}$ of 1.4427. The yield of n-butyl 2-dodecyl phthalate, based on n-butyl acid phthalate, was 92.9%.

*Example 9*

The reaction vessel was charged with approximately 74 parts of phthalic anhydride and 65 parts of 2-ethylhexyl alcohol which were heated to about 130° C. for 10 minutes and held at 105–110° C. for an additional 1½ hours to prepare 2-ethylhexyl acid phthalate, to which were added 105 parts of decene-1 and approximately one part of 72% perchloric acid as a catalyst. The mixture was heated at 85–90° C. for a period of 13 hours, then cooled to about —5° C. and filtered to remove any unreacted starting materials. The filtrate was mixed with 110 parts of water and agitated for about 5 minutes at 65–75° C. The organic layer was withdrawn from the aqueous layer, mixed with approximately 100 parts of water containing 7.1 parts by volume of 50% aqueous lye, and agitated for about 10 minutes at 65–70° C. The organic liquid layer was withdrawn and washed with two successive 100-part portions of water at 60–65° C. and the water washes discarded. The washed organic liquid was subjected to vacuum distillation to remove volatile components. The residue, approximately 145.2 parts by weight, was 2-decyl 2-ethylhexyl phthalate, specific gravity at 25° C. 0.973 and an $n_D^{25}$ of 1.480. The yield of 2-decyl 2-ethylhexyl phthalate, based on 2-ethylhexyl acid phthalate used, was 90.8%.

*Example 10*

The reaction vessel was charged with approximately 74 parts of phthalic anhydride and 37 parts of n-butyl alcohol which were heated to 126° C. for a period of 10 minutes and then held at a temperature of 110–120° C. for a period of 30 minutes. To the prepared n-butyl acid phthalate were added 105 parts of dodecene-1 and the mass heated to 70–75° C. for a period of 5–10 minutes. To the acid ester olefin mixture were added 5 parts of 100% sulfuric acid and 50 parts by volume of dioxane. The mass was heated at 80–85° C. for a period of 14 hours, cooled to about 0° C., and filtered to remove any unreacted starting materials. To the filtrate were added approximately 100 parts of water and the mixture was agitated for about 5 minutes at 55–60° C. The organic layer was withdrawn from the aqueous layer, mixed with approximately 120 parts of water containing 7.7 parts by volume of 50% aqueous lye, and agitated for about 10 minutes at 60–65° C. The organic liquid layer was withdrawn and washed with two successive 100-part portions of water at 65–75° C. and the water washes discarded. The washed organic liquid was then subjected to vacuum distillation to remove the volatile components. The organic residue, representing a substantial yield based on said ester used, was n-butyl 2-dodecyl phthalate.

*Example 11*

The reaction vessel was charged with approximately 148 parts of phthalic anhydride and 74 parts of n-butyl alcohol which were heated to about 120° C. over a period of 15 minutes. The mass was then heated to about 103° C. for about 35 minutes. To the prepared n-butyl acid phthalate were added approximately 210 parts of decene-1. The mass was heated for about 5–10 minutes at 75–80° C., 1 part of 72% perchloric acid was added, and the mass was heated at about 78–85° C. for a period of 12 hours. The reaction mass was cooled to 0° C. and filtered to recover any unreacted starting materials. To the filtrate were added 125 parts of water and the mass agitated for about 10 minutes at 60–65° C. The organic layer was separated from the aqueous layer, 125 parts of water containing 6.6 parts by volume of 50% aqueous lye were added, and the mass agitated for 10 minutes at 60–65° C. The organic layer was withdrawn and washed successively at 65–70° C. with two 125-part portions of water. The washed organic mass was then subjected to vacuum distillation to remove the volatile components. The organic residue, representing an excellent yield based on acid esters used, was substantially pure n-butyl 2-decyl phthalate.

*Example 12*

The reaction vessel was charged with approximately 109 parts of pyromellitic dianhydride and approximately 148 parts of n-butyl alcohol which were heated to about 120° C. over a period of about 3.5 hours. Thereafter, the excess of n-butyl alcohol was removed under vacuum (about 110 C./100 mm.). To the residue, i.e., di-n-butyl diacid pyromellitate, which was cooled to about 70° C., were added approximately 170 parts of octene-1 and the mass heated to about 92° C. over a period of about 20 minutes. Twenty parts by weight of boron trifluoride-diethyl ether addition compound (which contains 44% by weight of $BF_3$) were added and the mass heated at about 75–80° C. for about 17 hours. The mass was cooled to about 0° C., approximately 200 parts of water were added, and the mix agitated for about 5 minutes at 55–60° C. The organic layer was withdrawn from the aqueous layer, mixed with approximately 200 parts of water containing approximately 7.7 parts by volume of 50% aqueous lye, and the mass agitated for about 10 minutes at about 60–65° C., during which operation there was added sufficient aqueous sodium chloride to break the emulsion. The organic liquid layer was withdrawn and washed successively with two 100-part portions of water at 60–65° C. and the water washes discarded. The washed organic liquid was then subjected to vacuum distillation to remove the volatile components. The organic residue was approximately 248.2 parts of di-2-octyl di-n-butyl pyromellitate, specific gravity at 25° C. of 1.080 and an $n_D^{25}$ of 1.4830. The yield of said tetraesters was 92.2% based on di-n-butyl diacid pyromellitate.

*Example 13*

The reaction vessel was charged with approximately 74 parts of phthalic anhydride and approximately 37 parts of n-butyl alcohol. The mass was heated to about 126° C. over a 15-minute period and then heated for about 45 minutes at about 118° C. To the n-butyl acid phthalate obtained were added approximately 85 parts of caprylene (which was a mixture of octene-1 and octene-2 in a weight ratio of approximately 40:60) and approximately 44 parts of benzene. To this mass were added approximately 20 parts of boron trifluoride-diethyl ether addition compound (which contains 44% by weight of $BF_3$) and the mass was heated at 78–80° C. for about 10 hours. The mass was cooled to about 15° C., approximately 100 parts of water were added, and the mass agitated for about one minute at 60–65° C. The organic layer was withdrawn from the aqueous layer, mixed with approximately 100 parts of water containing approximately 12 parts by volume of 50% aqueous lye, and agitated for about 15 minutes at 60–65° C. The organic layer was separated from the aqueous layer and washed successively with two 100-part portions of water at 65–70° C. The washed organic liquid was then dried and subjected to vacuum distillation to remove the volatile components. The residue, approximately 132 parts by weight, was a mixture of n-butyl 3-octyl phthalate and n-butyl 2-octyl phthalate. The yield of said mixture of esters was 95.7% based on n-butyl acid phthalate.

*Example 14*

The reaction vessel was charged with approximately 148 parts of phthalic anhydride and approximately 74 parts of n-butyl alcohol which were heated to about 128° C. over a period of 10 minutes and then held at 110–115° C. for an additional 35 minutes to prepare n-butyl acid phthalate. After cooling to about 65–70° C., 2 parts by volume of 70–72% perchloric acid were added as a catalyst. Over a period of 4 hours, 105 parts of pentene-2 were added dropwise, such that the reaction mass temperature did not exceed 65–70° C. After the addition of the pentene-2 was completed, the reaction mixture was held for an additional two hours at 70–75° C., the mass then cooled to about 0° C. and filtered. To the filtrate were added 100 parts of water, and the mix was agitated for about 5 minutes at 60–65° C. The organic layer was separated from the aqueous layer and mixed with 100 parts of water containing approximately 7.1 parts by volume of 50% aqueous lye, and agitated for about 5 minutes at 50–55° C. The organic layer was then separated and washed successively with three 100-part portions of water at 60–65° C. The washed organic liquid was then subjected to vacuum distillation to remove all volatile components. The organic residue, approximately 230.2 parts, was predominantly a mixture having a specific gravity at 25° C. of 1.0366 and an $n_D^{25}$ of 1.4329, of n-butyl 2-pentyl phthalate and n-butyl 3-pentyl phthalate.

*Example 15*

The reaction vessel was charged with approximately 74 parts of phthalic anhydride and approximately 85 parts of tridecyl (oxo) alcohol which were heated to about 136° C. for a period of 10 minutes and then heated for about 1½ hours at about 118° C. To the tridecyl acid phthalate obtained were added 10 parts of boron trifluoride-diethyl ether addition complex. To the mixture of acid ester and catalyst were added, over a period of 6.5 hours, approximately 105 parts of pentene-2. The rate of addition of pentene-2 was controlled so that the temperature of the reaction mass was maintained at 65–75° C. At the end of the addition of the olefin, the mass was held at 75–80° C. for an additional 6 hours. The mass was then cooled to about 0° C. and filtered to remove any unreacted starting materials. To the filtrate were added approximately 100 parts of water and the mass agitated for about 5 minutes at 60–65° C. The organic layer was withdrawn from the aqueous layer, mixed with approximately 100 parts of water containing approximately 12 parts by volume of 50% aqueous lye, and the mass agitated for about 10 minutes at 60–65° C. The organic layer was separated from the aqueous layer and washed successively with two 100-part portions of water at 65–70° C. The washed organic liquid was then subjected to vacuum distillation to remove the volatile components. The organic residue, representing an excellent yield, was substantially pure 2-pentyl tridecyl phthalate.

*Example 16*

To a reaction vessel additionally fitted with a conventional Dean and Stark trap for water removal were added 146 parts of adipic acid, 74 parts of n-butyl alcohol and 2 parts of 78% sulfuric acid. The mix was heated to 125–130° C. and water of esterification was removed, via the butanol-water azeotrope, and collected in the trap. To the reaction mass containing butyl acid adipate were added 85 parts of 1-octene and 4 parts of 72% perchloric acid. The resulting mixture was heated at 135–145° C. for a period of 12 hours. The mass was cooled to about 10° C. and filtered to remove any unreacted starting materials. To the filtrate were added approximately 250 parts of water and the mass agitated for about 5 minutes at 65–70° C. The organic layer was withdrawn from the aqueous layer, mixed with approximately 200 parts of water containing approximately 6.6 parts by volume of 50% aqueous lye, and the mass agitated for about 10 minutes at 65–70° C. The organic layer was separated from the aqueous layer and washed successively with two 100-part portions of water at 75–80° C. The washed organic liquid was then dried and subjected to vacuum distillation to remove the volatile components. The organic residue was an excellent yield, based on adipic acid, of n-butyl 2-octyl adipate.

*Example 17*

The reaction vessel was charged with approximately 74 parts of phthalic anhydride and approximately 65 parts of 2-ethylhexanol which were heated to about 118° C. over an 18-minute period. The mass was then heated at about 103° C. for about 52 minutes to prepare 2-ethylhexyl acid phthalate, to which were added approximately 85 parts of 1-octene. This reaction mixture was heated for about 25 minutes at about 76° C. and 20 parts by weight of boron trifluoride-diethyl ether addition compound (which contains approximately 44% by weight of $BF_3$) were added as a catalyst. The mass was then heated at about 76–79° C. for about 10.3 hours and then filtered. The filtrate was mixed with about 100 parts of water and agitated for 10 minutes at 60–65° C. The organic layer was separated from the aqueous layer, mixed with 150 parts of water containing 6.2 parts by volume of 50% aqueous lye, and agitated for about 10 minutes at 60–65° C. The organic layer was separated from the aqueous layer and washed successively with two 100-part portions of water at 60–65° C. The washed organic liquid was subjected to vacuum distillation to remove the volatile components. The residue, 148.2 parts by weight, was 2-ethylhexyl 2-octyl phthalate having a specific gravity of 0.978 and an $n_D^{25}$ of 1.4836.

*Example 18*

To a quantity of butyl acid phthlate prepared as in Example 3 were added approximately 162 parts of octadecene-1, and the mass was heated to about 70–75° C. for 5 minutes. Then there were added as a catalyst approximately 20 parts of boron trifluoride-diethyl ether addition compound (which contains about 44% by weight of $BF_3$). Upon completion of the catalyst addition, the mass was heated at about 80–85° C. for about 12 hours to complete the esterification. The mass was then cooled to about 0° C. by an ice bath and filtered to remove any unreacted starting materials. To the filtrate were added approximately 100 parts of water, and the mix agitated for about 10 minutes at about 65–70° C. The organic layer was withdrawn from the aqueous layer, mixed with approximately 125 parts of water containing approximately 7.8 parts by volume of 50% aqueous lye, and the mix agitated for about 10 minutes at 60–65° C. The organic liquid layer was withdrawn and washed successively with 100-part portions of water at 60–65° C. and the water washes discarded. The washed organic liquid was then subjected to vacuum distillation to remove the volatile components. The organic residue, representing a substantial yield of neutral ester, was predominantly n-butyl 2-octadecyl phthalate.

*Example 19*

To a quantity of n-butyl acid phthalate prepared as in Example 3 were added approximately 85 parts of 1-octene and the mass heated to about 70–75° C. for about 5 minutes. To the mass were then added approximately 10 parts of anhydrous zinc chloride. Upon completing the catalyst addition, the mass was heated at about 75–80° C. for about 20 hours, cooled to about 0° C., and filtered to remove any unreacted starting materials. To the filtrate were added approximately 100 parts of water, and the mix was agitated for about 5 minutes at 65–70° C. The organic layer was withdrawn and mixed with 100 parts of water containing 6.8 parts by volume of 50% aqueous lye. The resulting mix was agitated for about 10 minutes at 60–65° C. The organic liquid layer was withdrawn and washed with approximately 100 parts of water at 60–65° C. and the water washes discarded. The washed organic liquid was then subjected to vacuum distillation to remove the volatile components. The organic residue, representing a substantial yield of neutral ester, based on the component of acid ester used, was predominantly n-butyl 2-octyl phthalate.

*Example 20*

To a quantity of n-butyl acid phthalate prepared as in Example 3, cooled to about 80° C., were added approximately 40 parts of benzene and approximately 74 parts of 4-methyl-pentene-2 and the mass heated at about 56° C. for about 3 minutes. To this mass were added approximately 20 parts of boron trifluoridediethyl ether addition compound (which contains approximately 44% by weight of $BF_3$), and the mass was heated in the range of 60–72°

C. over about a 9-hour period. The mass was cooled to about 0° C. and filtered. To the filtrate were added 100 parts of water and the mixture was agitated for about 5 minutes at 60–65° C. The organic layer was separated from the aqueous layer, mixed with 100 parts of water containing 15.2 parts by volume of 50% aqueous lye, and the mix agitated for about 5 minutes at 50–50% C. The organic layer was then separated and washed successively with three 100-part portions of water at 55–60° C. The washed organic liquid was subjected to vacuum distillation to remove the volatile components. The organic residue, approximately 95.8 parts, was substantially pure n-butyl 3-(2-methyl)pentyl phthalate.

*Example 21*

The reaction vessel was charged with approximately 162.7 parts of dibutyl isophthalate, 166 parts of isophthalic acid, 50 parts by volume of dibutyl ether and 30 parts of concentrated HCl which were heated to approximately 135–140° C. until the mix was homogeneous. The mass was cooled to 120–130° C. and 74 parts of n-butyl alcohol were added thereto. The mix was allowed to reflux 4 hours, an additional 15 parts of n-butyl alcohol were added, and the mix allowed to reflux an additional 2 hours. The mass was subjected to vacuum distillation to remove the volatile components and filtered at 80–85° C. to remove high-melting acid components. After adding 250 parts of water to the filtrate, the mass was made alkaline to pH 10 with 50% aqueous lye. The aqueous alkaline solution was then extracted with two successive 250-part portions of benzene and acidified with concentrated HCl to pH 2. The resulting precipitate was washed successively with five 250-part portions of water, followed by three recrystallizations from a benzene-petroleum ether mixture. The resulting material was dried to constant weight and approximately 120.8 parts by weight of n-butyl acid isophthalate, M.P. 65–67° C., neutral equivalent 230, were obtained. To 100 parts of this n-butyl acid isophthalate were added 77 parts of 1-octane and the mix heated to 70–75° C. for a period of 5 minutes, after which were added 15 parts of boron trifluoride-diethyl ether addition compound (which contains about 44% by weight of $BF_3$). Upon completing the catalyst addition, the mass was heated at about 80–85° C. for about 8 hours, cooled to about −10° C. and filtered to remove any unreacted starting materials. To the filtrate were added approximately 125 parts of water and the mix agitated for about 5 minutes at 55–60° C. The organic layer was withdrawn from the aqueous layer, mixed with approximately 100 parts of water containing 6.0 parts by volume of 50% aqueous lye, and the mix was agitated for about 10 minutes at 65–70° C. The organic liquid layer was withdrawn and washed with two successive 125-part portions of water at 75–80° C. and the water washes discarded. The washed organic liquid was then subjected to vacuum distillation to remove the volatile components. The residue, approximately 138.8 parts, was n-butyl 2-octyl isophthalate, specific gravity at 25° C. of 1.001 and an $n_D^{25}$ of 1.2676. The yield of n-butyl 2-octyl isophthalate, based on n-butyl acid isophthalate used, was 93.2%.

*Example 22*

To the reaction vessel, containing a quantity of n-butyl acid phthalate prepared as in Example 3, there were added approximately 680 parts of a mixture of olefins obtained by tripolymerization of propylene and containing predominantly olefins having nine carbon atoms. The olefin-butyl acid phthalate reaction mixture was heated to about 70–75° C. for approximately 10 minutes, and there were then added as a catalyst approximately 20 parts of boron trifluoride-diethyl ether addition compound (which contains about 44% by weight of $BF_3$). Upon completing the catalyst addition, the mass was heated at about 75–80° C. for about 12½ hours, then cooled to about 0° C. and filtered to remove any unreacted starting materials. The filtrate was then mixed with approximately 150 parts of water and agitated for about 5 minutes at 55–60° C. The organic layer was withdrawn from the aqueous layer, mixed with approximately 100 parts of water containing 7.8 parts of volume of 50% aqueous lye, and agitated for about 10 minutes at 60–65° C. The organic liquid layer was withdrawn and washed with two successive 100-part portions of water at 75–80° C. and the water washes discarded. The washed organic liquid was then subjected to vacuum distillation to remove the volatile components. The residue, representing a substantial yield based on butyl acid phthalate used, was a mixture of butyl nonyl phthalates having a specific gravity of 0.970 at 25° C. and an $n_D^{25}$ of 1.486.

*Example 23*

The reaction vessel was charged with approximately 143 parts of tetrachlorophthalic anhydride and approximately 37 parts of n-butyl alcohol which were heated to about 115–120° C. over a period of about 3½ hours, to prepare n-butyl acid tetrachlorophthalate, to which was added approximately 85 parts of 1-octene, and the mass was heated at about 85–95° C. for about 10 minutes. To the heated mass were then added approximately 2 parts by volume of 72% perchloric acid. Upon completing the catalyst addition, the mass was heated at about 85° C. for about 16 hours. The mass was then cooled to about 0° C. and filtered. To the filtrate were then added approximately 100 parts of water and the mix agitated for about 5 minutes at 60–65° C. The organic layer was withdrawn from the aqueous layer, mixed with approximately 100 parts of water containing 7.7 parts by volume of 50% aqueous lye, and agitated for about 10 minutes at 60–65° C. The organic liquid layer was withdrawn and washed with three successive 125-part portions of water at 70–75° C. and the water washes discarded. The washed organic liquid was then subjected to vacuum distillation to remove the volatile components. The residue, representing a substantial yield of neutral ester, was essentially pure n-butyl 2-octyl tetrachlorophthalate.

*Example 24*

To the reaction vessel were charged approximately 258 parts of n-butyl acid sebacate and 210 parts of 1-dodecene. The olefin-ester mass was heated to about 85° C. in about 30 minutes, at which time about 1 cc. of 72% perchloric acid was charged. Upon completion of the catalyst addition, the mass was heated at 135–145° C. for about 12 hours, cooled to about 0° C. and filtered. Approximately 250 parts of water were added to the filtrate and the resultant mix agitated for about 5 minutes at 75° C. After standing for a short time, the organic layer was withdrawn from the aqueous layer, mixed with approximately 250 parts of water containing 8.5 parts by volume of 50% aqueous lye, and this mix agitated for about 10 minutes at 80° C. The organic liquid layer was withdrawn and washed three successive times at 75° C. with 250 parts of water. The washed organic liquid was then subjected to vacuum distillation to remove the volatile components. The still residue was an excellent yield of n-butyl 2-dodecyl sebacate.

*Example 25*

The procedure of Example 22 was repeated, with the exception that for the mixture of olefins obtained by the tripolymerization of propylene as used in Example 22 there was used a mixture of olefins obtained by the polymerization of propylene to obtain propylene pentamers which are predominantly alpha olefins containing 15 carbon atoms. A substantial yield of n-butyl 2-pentadecyl phthalates was obtained.

Generally the esters prepared in accordance with the method of our invention have been found to be useful as plasticizers for vinyl chloride resins, particularly those phthalate esters having the structure,

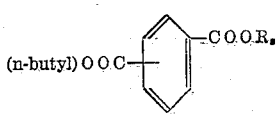

wherein the n-butyl ester group can be ortho, para or meta to the —COOR$_s$ ester group and R$_s$ is a secondary alkyl group containing 9 to 20 carbon atoms, such as 2-decyl, 3-decyl, 3-undecyl, 4-undecyl, 2-dodecyl, 3-dodecyl, 5-dodecyl, 2-tridecyl, 3-tridecyl, 3-tetradecyl, 2-pentadecyl, 5-pentadecyl, 2-hexadecyl, 3-hexadecyl, 2-heptyldecyl, 2-octadecyl, 5-octadecyl, 2-nondecyl and 2-eicosyl.

Where employing these phthalate esters as a plasticizer for polyvinyl chloride resins, they can be used at a concentration of from about 20 parts by weight to about 300 parts by weight per 100 parts by weight of polyvinyl chloride resin.

"Polyvinyl chloride resin" is intended to encompass polyvinyl chloride, vinyl chloride copolymers and compositions containing polymerized polyvinyl chloride. Examples of such polyvinyl chloride resins are illustrated by polyvinyl chloride and copolymers of vinyl chloride with vinyl acetate, methyl methacrylate, diethyl maleate or vinylidene chloride, particularly those copolymers containing at least 85% of combined vinyl chloride.

The olefinic hydrocarbon reactants which can be employed in the process of this invention may be charged as a substantially pure, individual olefin, as shown in some of the foregoing examples, or may be charged as a mixture of olefinic components having the required molecular chain lengths. Olefinic hydrocarbons of these characteristics may be obtained from any suitable source, but are most conveniently derived from the olefinic fractions of thermally and/or catalytically cracked petroleum products. Particularly suitable are those olefinic fractions boiling at atmospheric pressure in the range of from about 165° C. to about 225° C., including olefinic polymer products boiling within this range and formed by the catalytic or thermal polymerization of lower molecular weight monomers such as monomers containing from about two to about four atoms per molecule.

*Example 26*

To the reaction vessel containing 111 parts of n-butyl acid phthalate there were added approximately 115 parts of a mixture of essentially mono-ethylenically unsaturated olefins containing from 10 to 12 carbon atoms having a boiling range at 100 mm. Hg of 108–153° C., a specific gravity at 20°/4° of 0.753, and an $n_D^{25}$ of 1.427. The olefin-butyl acid phthalate mixture was heated to about 80–85° C., and there were then added as a catalyst approximately 20 parts of BF$_3$-diethyl ether addition complex. Upon completing the catalyst addition, the mass was heated at about 80–85° C. for about 10 hours, then cooled to about 10° C. and filtered to remove any unreacted starting materials. The filtrate was mixed with approximately 150 parts of water and agitated for about 10 minutes at 65–70° C. The organic layer was separated from the aqueous layer, mixed with approximately 150 parts of water containing 7.8 parts by volume of 50% aqueous lye, and agitated for about 10 minutes at 65–70° C. The organic liquid layer was withdrawn and washed with two successive 150-part portions of water at 65–70° C. and the water washes discarded. The washed organic liquid was then subjected to vacuum distillation to remove the volatile components. The residue, having a specific gravity at 20°/4° of 0.978 and an $n_D^{25}$ of 1.4810, represented a 92.6% yield based on butyl acid phthalate used, and was a mixture of n-butyl sec.-alkyl phthalates in which the sec.-alkyl radicals contained 10, 11 and 12 carbon atoms.

*Example 27*

To the reaction vessel containing 111 parts of n-butyl acid phthalate there were added approximately 136 parts of a mixture of essentially mono-ethylenically unsaturated olefins containing from 10 to 16 carbon atoms having a boiling range of 165° C. at atmospheric pressure to 185° C. at 52 mm. Hg, a specific gravity at 20°/4° of 0.7635, and an $n_D^{25}$ of 1.4339. The olefin-butyl acid phthalate mixture was heated to about 85–90° C., and there were then added as a catalyst approximately 20 parts of BF$_3$-diethyl ether addition complex. Upon completing the catalyst addition, the mass was heated at about 85–90° C. for about 14 hours, then cooled to about 10° C. and filtered to remove any unreacted starting materials. The filtrate was mixed with approximately 150 parts of water and agitated for about 10 minutes at 65–70° C. The organic layer was separated from the aqueous layer, mixed with approximately 150 parts of water containing 7.8 parts by volume of 50% aqueous lye, and agitated for about 10 minutes at 65–70° C. The organic liquid layer was withdrawn and washed with two successive 150-part portions of water at 65–70° C. and the water washes discarded. The washed organic liquid was then subjected to vacuum distillation to remove the volatile components. The residue, having a specific gravity at 20°/4° of 0.962 and an $n_D^{25}$ of 1.476, represented a 90.1% yield based on butyl acid phthalate used, and was a mixture of n-butyl sec.-alkyl phthalates in which the sec.-alkyl radicals contained 10, 11, 12, 13, 15 and 16 carbon atoms.

In Examples 4, 6, 18, 19, 20, 22 and 25, the quantity of n-butyl acid phthalate employed in each of those examples was the same quantity as prepared by the procedure described in Example 3. Furthermore, in Examples 3, 7, 15, 26 and 27, the boron trifluoride-diethyl ether addition compound employed as the catalyst in each case contained about 44% by weight of boron trifluoride (BF$_3$).

Since obvious changes may be made without departing from the spirit or scope of the invention, it is intended that the above examples shall be interpreted as illustrative, and not limiting in any sense or manner.

What is claimed is:

1. The method comprising reacting a mono-olefin of the structure,

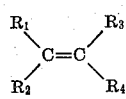

wherein R$_1$, R$_2$, R$_3$ and R$_4$ are selected from the group consisting of hydrogen and saturated aliphatic hydrocarbon radicals, at least one of R$_1$, R$_2$, R$_3$ and R$_4$ is hydrogen and the total number of carbon atoms of R$_1$, R$_2$, R$_3$ and R$_4$ is at least 3, with an acid ester of the structure, $$(HOOC)_m—R—(COOCH_2R')_n$$

wherein R is a polyvalent hydrocarbon radical free from aliphatic carbon to carbon unsaturation, R' is a saturated aliphatic hydrocarbon radical containing at least 3 carbon atoms, $m$ is a whole number from 1 to 5, $n$ is a whole number from 1 to 5, and the sum of $m+n$ is from 2 to 6.

2. The method of claim 1 wherein, the radical represented by R contains from 2 to 14 carbon atoms, and the radical represented by R' contains from 3 to 20 carbon atoms.

3. The method of claim 2 wherein the olefin is of the structure, $$R_a—CH=CH—(CH_2)_x—H$$

where $x$ is a whole number from 0 to 9, and R$_a$ is a saturated aliphatic hydrocarbon radical containing from 3 to 18 carbon atoms, said olefin containing no more than 20 carbon atoms.

4. The method comprising reacting an acid ester of a phenylene dicarboxylic acid of the structure, $$HOOC-C_6H_4-COOCH_2R'$$

wherein R′ is an alkyl radical containing from 3 to 20 carbon atoms, with a mono-olefin of the structure, $$R_a-CH=CH-(CH_2)_x-H$$

wherein $x$ is an integer from 0 to 9 and wherein $R_a$ is a saturated aliphatic hydrocarbon radical containing from 3 to 18 carbon atoms.

5. The method of claim 4 wherein R′ is an alkyl radical containing 7 carbon atoms.

6. The method of claim 4 wherein R′ is an alkyl radical containing 3 carbon atoms.

7. The method comprising reaction n-butyl acid phthalate with mono-olefins boiling at atmospheric pressure within the range of about 165° C. to about 225° C.

8. The method comprising reacting n-butyl acid phthalate with mono-olefins boiling within the range of about 165° C. at atmospheric pressure to about 185° C. at 50 mm. Hg pressure.

9. The method comprising reacting n-butyl acid phthalate with mono-olefins containing 10 to 16 carbon atoms.

10. The method comprising reacting n-butyl acid phthalate with mono-olefins containing 12 carbon atoms.

11. The method comprising reacting n-butyl acid phthalate with mono-olefins obtained by the polymerization of propylene to produce propylene tetramers.

12. The method comprising reacting n-butyl acid phthalate with mono-olefins obtained by the polymerization of propylene to produce pentamers.

13. The method comprising reacting n-butyl acid phthalate with mono-olefins obtained by the polymerization of propylene to produce trimers.

14. The method of claim 1 wherein R is an alkylene radical containing 2 to 14 carbon atoms, R′ is an alkyl radical containing from 3 to 20 carbon atoms, and the olefin is a mono-olefin of the structure, $$R_a-CH=CH-(CH_2)_x-H$$

wherein $x$ is an integer of from 0 to 9 and $R_a$ is an alkyl radical containing from 3 to 18 carbon atoms.

15. The method comprising reacting n-butyl acid adipate with a mono-olefin containing at least 5 carbon atoms.

16. The method of claim 2 wherein the olefin is of the structure, $$R_1-CH=CH-R_3$$

wherein $R_1$ and $R_3$ are saturated aliphatic hydrocarbon radicals, said olefin containing no more than 20 carbon atoms.

17. The method comprising reacting an alkyl isophthalate wherein the alkyl group has from 4 to 20 carbon atoms with a mono-olefin containing 10 to 16 carbon atoms.

18. The method comprising reacting n-butyl isophthalate with a mono-olefin containing 10 to 16 carbon atoms.

19. The method of claim 1 where the reaction is conducted in the presence of a catalyst selected from the group consisting of perchloric acid and boron trifluoride.

20. The method of claim 4 where the reaction is conducted in the presence of a catalyst selected from the group consisting of perchloric acid and boron trifluoride.

References Cited in the file of this patent
UNITED STATES PATENTS

| | | |
|---|---|---|
| 2,198,046 | Vierling | Apr. 23, 1940 |
| 2,530,852 | Bixby | Nov. 21, 1950 |

OTHER REFERENCES

Groggins: Unit Processes in Organic Synthesis, McGraw-Hill, New York, 1952 (4th edition), page 622.

UNITED STATES PATENT OFFICE
CERTIFICATE OF CORRECTION

Patent No. 2,975,210                 March 14, 1961

Louis O. Raether et al.

It is hereby certified that error appears in the above numbered patent requiring correction and that the said Letters Patent should read as corrected below.

Column 2, line 16, after "one," insert -- n is one or a whole number greater than one, --; column 9, line 13, for "85" read -- 95 --; column 11, line 7, for "50-50% C." read 50-55° C. --; line 39, for "1-octane" read -- 1-octene --; column 12, line 71, for "alpha" read -- *alpha* --.

Signed and sealed this 3rd day of October 1961.

(SEAL)
Attest:

ERNEST W. SWIDER                DAVID L. LADD
Attesting Officer                Commissioner of Patents